(12) United States Patent
Lu et al.

(10) Patent No.: US 11,430,981 B2
(45) Date of Patent: Aug. 30, 2022

(54) TITANIUM NIOBIUM OXIDE AND TITANIUM OXIDE COMPOSITE ANODE MATERIALS

(71) Applicant: GM GLOBAL TECHNOLOGY OPERATIONS LLC, Detroit, MI (US)

(72) Inventors: Yong Lu, Shanghai (CN); Dewen Kong, Shanghai (CN); Mengyan Hou, Shanghai (CN); Zhe Li, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 16/661,332

(22) Filed: Oct. 23, 2019

(65) Prior Publication Data

US 2021/0066711 A1     Mar. 4, 2021

(30) Foreign Application Priority Data

Sep. 4, 2019 (CN) .......................... 201910830860.0

(51) Int. Cl.
| | | |
|---|---|---|
| *H01M 4/36* | (2006.01) | |
| *H01M 4/48* | (2010.01) | |
| *H01M 4/485* | (2010.01) | |
| *H01M 10/0525* | (2010.01) | |
| *H01M 10/054* | (2010.01) | |
| *H01M 4/02* | (2006.01) | |

(52) U.S. Cl.
CPC ........... *H01M 4/364* (2013.01); *H01M 4/483* (2013.01); *H01M 4/485* (2013.01); *H01M 10/054* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2019/0296343 A1* 9/2019 Harada .................. B60L 50/64

FOREIGN PATENT DOCUMENTS

| CN | 112447940 A | 3/2021 |
|---|---|---|
| WO | 2018132992 A1 | 7/2018 |
| WO | 2018165824 A1 | 9/2018 |
| WO | 2018165825 A1 | 9/2018 |

* cited by examiner

*Primary Examiner* — Tanisha Diggs
(74) *Attorney, Agent, or Firm* — Harness, Dickey & Pierce, P.L.C.

(57) ABSTRACT

A material including $TiO_2$ nanoparticles at least partially embedded in a matrix material of $Ti_xNb_yO_z$, where $0<x\leq2$, $0<y\leq24$, and $0<z\leq62$, is provided. Methods of making the material are also provided.

19 Claims, 5 Drawing Sheets

TITANIUM NIOBIUM OXIDE AND TITANIUM OXIDE COMPOSITE ANODE MATERIALS

CROSS-REFERENCE TO RELATED APPLICATIONS

This application claims the benefit and priority of Chinese Patent Application No. 201910830860.0, filed Sep. 4, 2019. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("µBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte disposed between solid-state electrodes, the solid-state electrolyte physically separates the electrodes so that a distinct separator is not required.

Negative electrodes often include a lithium insertion material or an alloy host material. Typical electroactive materials for forming an anode include lithium-graphite intercalation compounds, lithium-silicon insertion compounds, lithium-tin insertion compounds, or lithium alloys. While graphite compounds are common, anode materials with high specific capacity (relative to graphite) are of growing interest. Titanium niobium oxide ($Ti_xNb_yO_z$), for example, has a high capacity and improved power performance relative to graphite; however, when considering its commercialization, it is constricted by the relative high cost of niobium. Meanwhile, relative to graphite, titanium oxide ($TiO_2$) also excels in capacity, power capability, and cost, but has a limited compacted density and a relatively higher voltage plateau. Therefore, the development of composite anodes that overcome these shortcomings and enhance these advantages is desirable.

SUMMARY

This section provides a general summary of the disclosure, and is not a comprehensive disclosure of its full scope or all of its features.

In various aspects, the current technology provides a material including titanium oxide ($TiO_2$) nanoparticles at least partially embedded in a matrix material having titanium niobium oxide ($Ti_xNb_yO_z$), where $0<x\leq2$, $0<y\leq24$, and $0<z\leq62$.

In one aspect, the matrix material includes $TiNb_2O_7$, $Ti_2Nb_{10}O_{29}$, $TiNb_6O_{17}$, or $TiNb_{24}O_{62}$.

In one aspect, a portion of the $TiO_2$ nanoparticles are partially embedded in the matrix material.

In one aspect, a portion of the $TiO_2$ nanoparticles are completely embedded in the matrix material.

In one aspect, the material has a $Ti_xNb_yO_z:TiO_2$ weight ratio of greater than or equal to about 0.01 to less than or equal to about 0.99.

In one aspect, the $TiO_2$ nanoparticles have a maximum dimension of greater than or equal to about 1 nm to less than or equal to about 1000 nm.

In one aspect, the matrix material includes a plurality of species of the $Ti_xNb_yO_z$, where $0<x\leq2$, $0<y\leq24$, and $0<z\leq62$.

In one aspect, the material is at least one of coated with or doped with a transition, a transition metal compound, or a carbon-based material including graphene, reduced oxide graphene, carbon nanotubes, carbon fibers, and combinations thereof.

In one aspect, the current technology also provides a negative electrode or an anode including the material.

In one aspect, the current technology further provides an electrochemical cell including the negative electrode or anode.

In various aspects, the current technology also provides a negative electrode or an anode having an anode material including $TiO_2$ nanoparticles embedded in a matrix material including $Ti_xNb_yO_z$, where $0<x\leq2$, $0<y\leq24$, and $0<z\leq62$, wherein the anode material has a $Ti_xNb_yO_z:TiO_2$ weight ratio of greater than or equal to about 0.01 to less than or equal to about 0.99.

In one aspect, the negative electrode or anode is disposed in an electrochemical cell that cycles lithium or sodium ions.

In one aspect, the negative electrode or anode is disposed in a solid-state electrochemical cell.

In various aspects, the current technology further provides a method of producing a material, the method including forming a mixture of starting materials in a ball milling container, the starting materials including a precursor material having at least one of $Nb_2O_5$ or $Ti_aNb_bO_c$, where $0\leq a\leq2$, $0<b\leq24$, and $0<c\leq62$, and $TiO_2$ particles; and ball milling the mixture to form the material, wherein the material has $TiO_2$ nanoparticles at least partially embedded in a matrix material including $Ti_xNb_yO_z$, where $0<x\leq2$, $0<y\leq24$, and $0<z\leq62$.

In one aspect, the starting materials further include a liquid dispersing agent, wherein the liquid dispersing agent is provided at a volume of greater than 0 mL to less than or equal to 2V/3, where V is the volume of the ball milling container in mL.

In one aspect, the precursor material and the $TiO_2$ particles are combined at a predetermined precursor material:$TiO_2$ particles molar ratio of about 0.01 to about 15 in order to arrive at the material with a predetermined stoichiometry for the x, y, and z and a predetermined $Ti_xNb_yO_z:TiO_2$ composite weight ratio of greater than or equal to about 0.01 to less than or equal to about 0.99.

In one aspect, the molar ratio is greater than or equal to about 0.5 to less than or equal to about 15.

In one aspect, the ball milling is performed at a speed of greater than or equal to about 100 rpm to less than or equal to about 1000 rpm for a time period of greater than or equal to about 30 minutes to less than or equal to about 24 hours.

In one aspect, the method further includes heating the material at a temperature of from greater than or equal to about 600° C. to less than or equal to about 1200° C. for a time period of greater than or equal to about 3 hours to less than or equal to about 24 hours.

In one aspect, the method further includes disposing the material as a negative electrode or an anode into an electrochemical cell having an electrolyte and a positive electrode or a cathode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
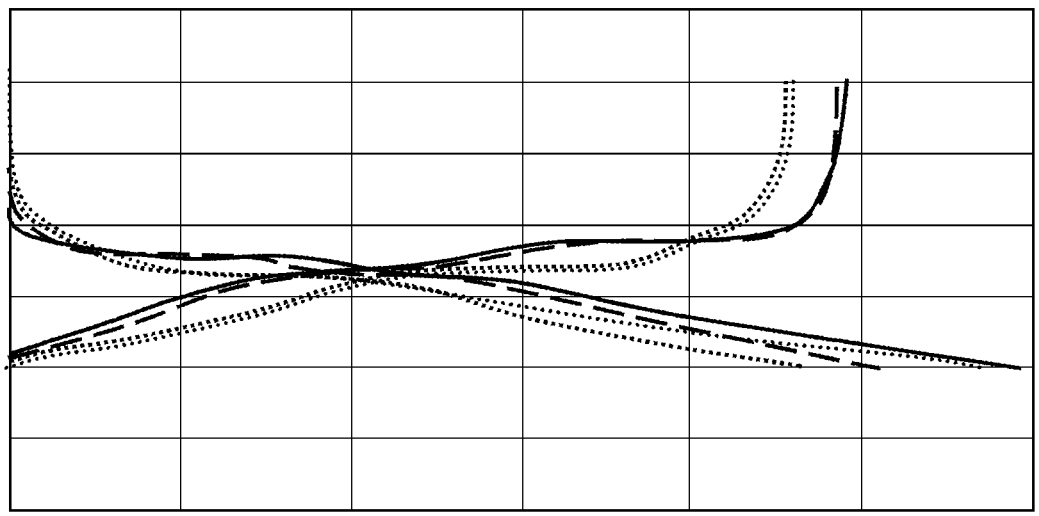

FIG. 4 is a 0.1C charge-discharge graph of $TiNb_2O_7$—$TiO_2$ (of the current technology) versus $TiNb_2O_7$ alone. The y-axis represents voltage from 0 V to 3.5 V, and the x-axis represents capacity from 0 mAh/g to 300 mAh/g. Solid lines represent $TiNb_2O_7$—$TiO_2$ during a first cycle, dashed lines represent $TiNb_2O_7$—$TiO_2$ during a second cycle, square-dotted lines represent $TiNb_2O_7$ alone during a first cycle, and circular-dotted lines represent $TiNb_2O_7$ alone during a second cycle.

Figure 5:
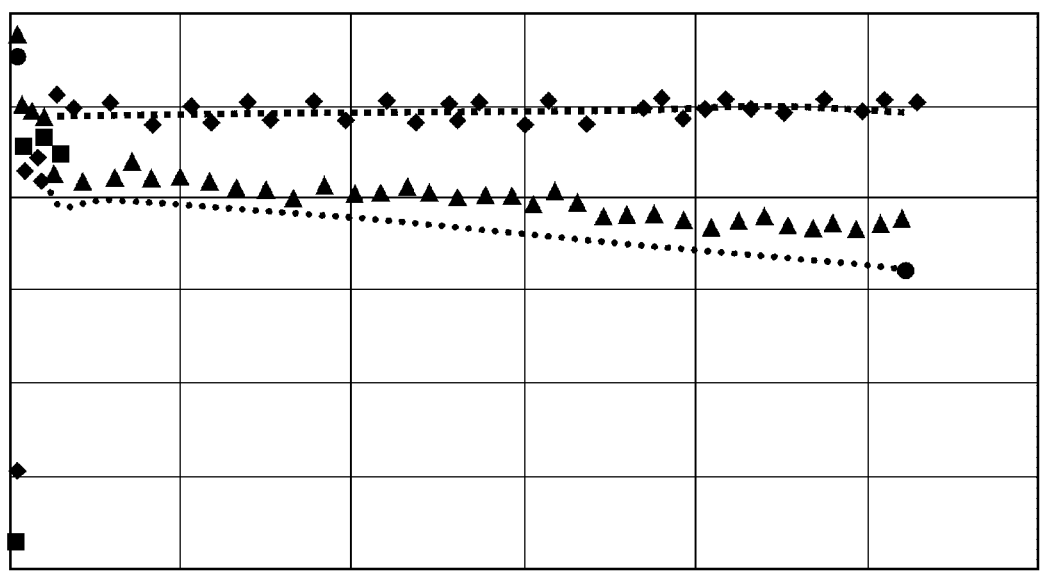

FIG. 5 is a graph showing 1C cycle performance for $TiNb_2O_7$—$TiO_2$ (of the current technology) versus $TiNb_2O_7$ alone. The y-axis on the left side of the graph represents capacity from 0 mAh/g to 300 mAh/g, the y-axis on the right side of the graph represents coulombic efficiency from 80% to 104%, and the x-axis represents cycle number from 1 cycle to 120 cycles. Triangles represent the capacity of $TiNb_2O_7$—$TiO_2$, circles represent the capacity of $TiNb_2O_7$ alone, diamonds represent the coulombic efficiency of $TiNb_2O_7$—$TiO_2$, and squares represent the coulombic efficiency of $TiNb_2O_7$ alone.

Figure 6:
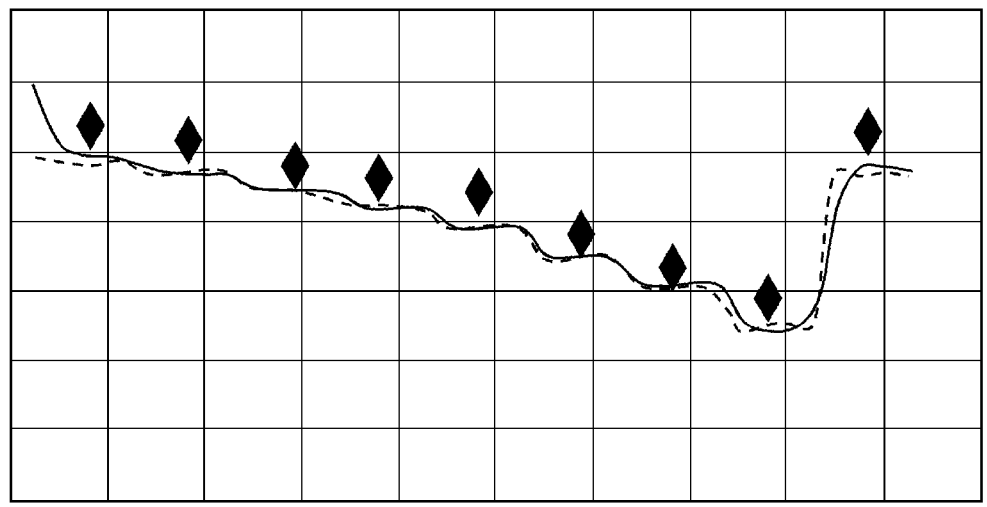

FIG. 6 is a graph showing rate performance of a $TiNb_2O_7$—$TiO_2$ anode made in accordance with various aspects of the current technology. The y-axis represents capacity from 0 mAh/g to 350 mAh/g, and the x-axis represents cycle number from 0 cycles to 40 cycles. The solid line represents discharge, and the dashed line represents charge. From left to right, the diamonds represent 0.1C, 0.2C, 0.5C, 1C, 2C, 5C, 10C, 20C, and 0.1C, where charge and discharge are tested at the same rate.

Figure 7:
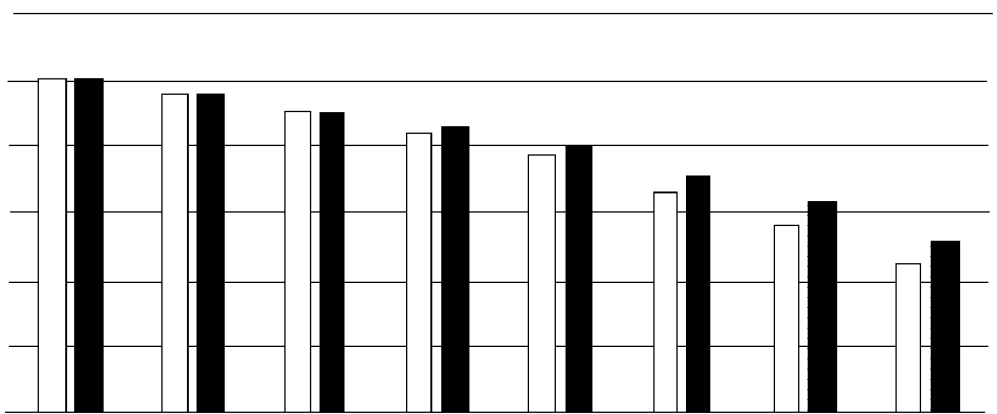

FIG. 7 is a graph showing capacity retention results of an X/X C-rate performance test. The y-axis represents capacity retention from 0% to 120%, and the x-axis represents C-rates of 0.1C, 0.2C, 0.5C, 1C, 2C, 5C, 10C, and 20C. The white bars represent $TiNb_2O_7$ alone and the black bars represent $TiNb_2O_7$—$TiO_2$ in accordance with various aspects of the current technology.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
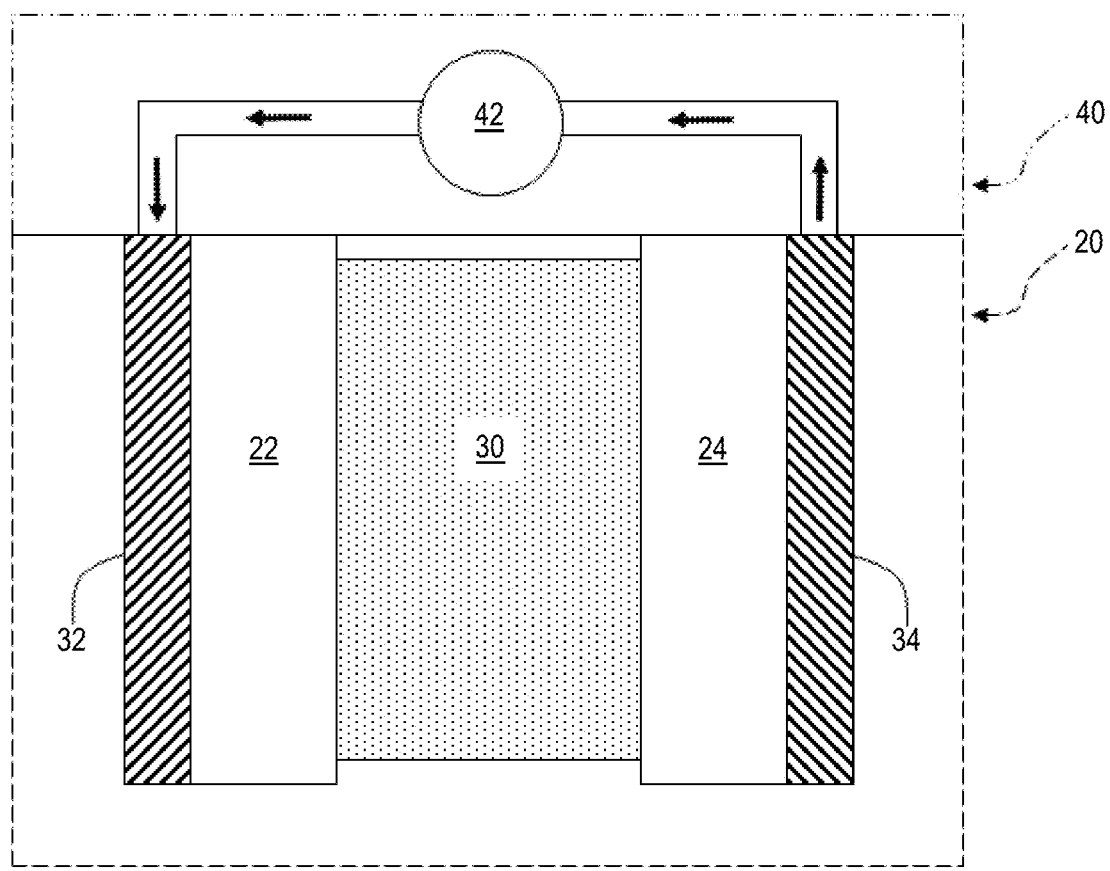
FIG. 1 is an illustration of an electrochemical cell in accordance with various aspects of the current technology.

An exemplary schematic illustration of an electrochemical cell 20 (also referred to as the battery) that cycles lithium ions is shown in FIG. 1. Unless specifically indicated otherwise, the term "ions" as used herein refers to lithium ions or sodium ions. The battery 20 includes a negative electrode (i.e., an anode) 22, a positive electrode (i.e., a cathode) 24, and a separator 30 (e.g., a microporous polymeric separator) disposed between the two electrodes 22, 24. An electrolyte is present throughout the separator 30 and, optionally, in the negative electrode 22 and positive electrode 24. In solid-state batteries, the electrolyte is solid and defines the separator. A negative electrode current collector 32 may be positioned at or near the negative electrode 22, and a positive electrode current collector 34 may be positioned at or near the positive electrode 24. The negative electrode current collector 32 and positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include a binder, such as polyvinylidene fluoride (PVDF), and/or an electrically conductive carbon, such as carbon black or carbon nanotubes, which is dispersed throughout materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium or sodium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution contained in the separator 30 towards the positive electrode 24. The electrons flow through the external circuit 40 and the lithium ions migrate across the separator 30 containing the electrolyte solution to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the battery 20 to reverse the electrochemical reactions that occur during battery discharge. The connection of an external electrical energy source to the battery 20 compels the otherwise non-spontaneous oxidation of intercalated lithium at the positive electrode 24 to produce electrons and ions. The electrons, which flow back towards the negative electrode 22 through the external circuit 40, and the ions, which are carried by the electrolyte solution across the separator 30 back towards the negative electrode 22, reunite at the negative electrode 22 and replenish it with lithium or sodium for use during the next battery discharge event. As such, each complete discharging event followed by a complete charging event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators, and AC-DC converters connected to an AC electrical power grid through a wall outlet and a motor vehicle alternator.

In many ion battery configurations, each of the negative electrode current collector 32, the negative electrode 22, the separator 30, the positive electrode 24, and the positive electrode current collector 34 are prepared as relatively thin layers (for example, from several microns to a fraction of a millimeter or less in thickness) and assembled in layers connected in electrical parallel arrangement to provide a suitable electrical energy and power package. In various other instances, the battery 20 may include electrodes 22, 24 that are connected in series. Further, the separator 30 operates as an electrical insulator by being sandwiched between the negative electrode 22 and the positive electrode 24 to prevent physical contact and, thus, the occurrence of a short circuit. In addition to providing a physical barrier between the two electrodes 22, 24, the separator 30 acts like a sponge that contains the electrolyte solution in a network of open pores during the cycling of lithium ions to facilitate functioning of the battery 20.

The battery 20 can include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 30. As noted above, the size and shape of the battery 20 may vary depending on the particular application for which it is designed. Battery-powered vehicles and hand-held consumer electronic devices, for instance, are two examples where the battery 20 would most likely be designed to different size, capacity, and power-output specifications. The battery 20 may also be connected in series or parallel with other similar lithium ion cells or batteries to produce a greater voltage output, energy, and power if it is required by the load device 42.

Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically powered devices, a few examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

Any appropriate electrolyte, whether in solid form (such as in a solid-state electrochemical cell) or solution, capable of conducting lithium ions between the negative electrode 22 and the positive electrode 24 may be used in the lithium ion battery 20. In certain aspects, the electrolyte solution may be a nonaqueous liquid electrolyte solution that includes a lithium salt dissolved in an organic solvent or a mixture of organic solvents. Numerous conventional non-aqueous liquid electrolyte solutions may be employed in the lithium ion battery 20. A non-limiting list of lithium salts that may be dissolved in an organic solvent to form the nonaqueous liquid electrolyte solution include $LiPF_6$, $LiClO_4$, $LiAlCl_4$, $LiI$, $LiBr$, $LiSCN$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including, but not limited to, various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

In various aspects, the electrolyte may be a solid-state electrolyte including one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure. In various aspects, the polymer-based particles may be intermingled with a lithium salt like those described above, so as to act as a solid solvent. In certain variations, the polymer-based particles may comprise one or more of polymer materials selected from the group consisting of polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene (PVDF-HFP), polyvinyl chloride (PVC), and combinations thereof.

The oxide-based particles may comprise one or more garnet ceramics, LISICON-type oxides, NASICON-type oxides, and Perovskite type ceramics. For example, the one or more garnet ceramics may be selected from the group consisting of $Li_{6.5}La_3Zr_{1.75}Te_{0.25}O_{12}$, $Li_7La_3Zr_2Oi_2$, $Li_{6.2}Ga_{0.3}La_{2.95}Rb_{0.05}Zr_2Oi_2$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, and combinations thereof. The one or more LISICON-type oxides may be selected from the group consisting of $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of $Li_{1+x}Al_xGe_{2-x}(PO_4)_3$ (LAGP) (where 0≤x≤2), $Li_{1+x}Al_xTi_{2-x}(PO_4)_3$ (LATP) (where 0≤x≤2), $Li_{1+x}Y_xZr_{2-x}(PO_4)_3$ (LYZP) (where 0≤x≤2), $Li_{1.3}Al_{0.3}Ti_{1.7}(PO_4)_3$, $LiTi_2(PO_4)_3$, $LiGe(PO_4)_3$, $LiGe_2(PO_4)_3$, $LiHf_2(PO_4)_3$, and combinations thereof. The one or more Perovskite-type ceramics may be selected from the group consisting of $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

The sulfide-based particles may include one or more sulfide-based materials selected from the group consisting of $Li_2S$—$P_2S_5$, $Li_2S$—$P_2S_5$-$MS_x$ (where M is Si, Ge, and Sn and 0≤x≤2), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_2S_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}C_{10.3}$, $(1-x)P_2S_5$-$xLi_2S$ (where 0.5≤x≤0.7), and combinations thereof.

The halide-based particles may include one or more halide-based materials selected from the group consisting of $Li_2CdCl_4$, $Li_2MgCl_4$, $Li_2CdI_4$, $Li_2ZnI_4$, $Li_3OCl$, $LiI$, $Li_5ZnI_4$, $Li_3OCl_{1-x}Br_x$ (where 0<x<1), and combinations thereof.

The borate-based particles may include one or more borate-based materials selected from the group consisting of $Li_2B_4O_7$, $Li_2O$—$(B_2O_3)$—$(P_2O_5)$, and combinations thereof. In one variation, the one or more borate-based materials may have an ionic conductivity greater than or equal to about $10^{-7}$ S/cm to less than or equal to about $10^{-6}$ S/cm.

The nitride-based particles may include one or more nitride-based materials selected from the group consisting of $Li_3N$, $Li_7PN_4$, $LiSi_2N_3$, LiPON, and combinations thereof. In one variation, the one or more nitride-based materials may have an ionic conductivity greater than or equal to about $10^{-9}$ S/cm to less than or equal to about $10^{-3}$ S/cm.

The hydride-based particles may include one or more hydride-based materials selected from the group consisting of $Li_3AlH_6$, $LiBH_4$, $LiBH_4$—LiX (where X is one of Cl, Br, and I), $LiNH_2$, $Li_2NH$, $LiBH_4$—$LiNH_2$, and combinations thereof. In one variation, the one or more hydride-based materials may have an ionic conductivity greater than or equal to about $10^{-7}$ S/cm to less than or equal to about $10^{-4}$ S/cm.

In still further variations, the electrolyte may be a quasi-solid electrolyte comprising a hybrid of the above detailed nonaqueous liquid electrolyte solution and solid-state electrolyte systems—for example including one or more ionic liquids and one or more metal oxide particles, such as aluminum oxide ($Al_2O_3$) and/or silicon dioxide ($SiO_2$).

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 30. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 30 may also comprise other polymers in addition to the polyolefin, such as, but not limited to, polyethylene terephthalate (PET), polyvinylidene fluoride (PVDF), and/or a polyamide. Furthermore, the porous separator 30 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Commercially available polyolefin porous membranes include CELGARD® 2500 (a monolayer polypropylene separator) and CELGARD® 2320 (a trilayer polypropylene/polyethylene/polypropylene separator) available from Celgard, LLC. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such microporous polymer separators 30.

The positive electrode 24 may be formed from a lithium-based or sodium-based active material that can sufficiently undergo lithium/sodium intercalation and deintercalation, or alloying and dealloying, while functioning as the positive terminal of the battery 20. In various aspects, the positive electrode 24 may be one of a layered-oxide cathode, a spinel cathode, and a polyanion cathode. For example, in the instances of a layered-oxide cathode (e.g., rock salt layered oxides), the positive solid-state electroactive particles may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries or $NaCoO_2$, $NaMnO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), and $Na_{1+x}MO_2$ (where $0 \leq x \leq 1$) for solid-state sodium-ion batteries. The spinel cathode may include one or more positive electroactive materials, such as $LiMn_2O_4$ and $LiNi_xMn_{1.5}O_4$ for lithium-ion batteries and $NaMn_2O_4$ and $NaNi_xMn_{1-x}O_4$ for sodium-ion batteries. The polyanion cation may include, for example, a phosphate such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries; a phosphate such as $NaFePO_4$, $NaVPO_4$, $NaV_2(PO_4)_3$, $Na_2FePO_4F$, $Na_3Fe_3(PO_4)_4$, or $Na_3V_2(PO_4)F_3$ for sodium-ion batteries; and/or a silicate such as $LiFeSiO_4$ or $NaFeSiO_4$ for lithium- or sodium-ion batteries, respectively. In this fashion, in various aspects, positive solid-state electroactive particles may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof or $NaCoO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), $Na_{1+x}MO_2$ (where $0 \leq x \leq 1$), $NaMn_2O_4$, $NaNi_xMn_{1.5}O_4$, $NaFePO_4$, $NaVPO_4$, $NaV_2(PO_4)_3$, $Na_2FePO_4F$, $Na_3Fe_3(PO_4)_4$, $Na_3V_2(PO_4)F_3$, $NaFeSiO_4$, and combinations thereof. In certain aspects, the positive solid-state electroactive particles may be coated (for example, by $Al_2O_3$) and/or the positive electroactive material may be doped (for example, by magnesium (Mg)).

In certain variations, the positive active materials may be intermingled with an electronically conducting material that provides an electron conduction path, electrically conductive materials, and/or at least one polymeric binder material that improves the structural integrity of the electrode.

In various aspects, the negative electrode 22 or anode includes an electroactive material that may be a lithium host material capable of functioning as a negative terminal of a lithium ion battery. Notably, the present technology is particularly suitable for use with negative electrode (anode) electroactive materials for lithium ion batteries that undergo substantial volumetric changes during operation of the battery. The negative electrode 22 may thus include the electroactive lithium host material, which experiences volumetric expansion and contraction as lithium cycles during operation of the battery 20. In certain aspects, the negative electrode materials for the negative electrode 22 comprise titanium dioxide ($TiO_2$). As noted above, $TiO_2$ has a limited compacted density and a high voltage plateau relative to graphite. Titanium niobium oxide ($Ti_xNb_yO_z$) is also useful as it is safe, provides excellent power performance, and has a high theoretic capacity (for example, $TiNb_2O_7$ has a capacity of greater than about 387 mAh/g). However, the expense of niobium prevents $Ti_xNb_yO_z$ from being widely used.

Figure 2A:
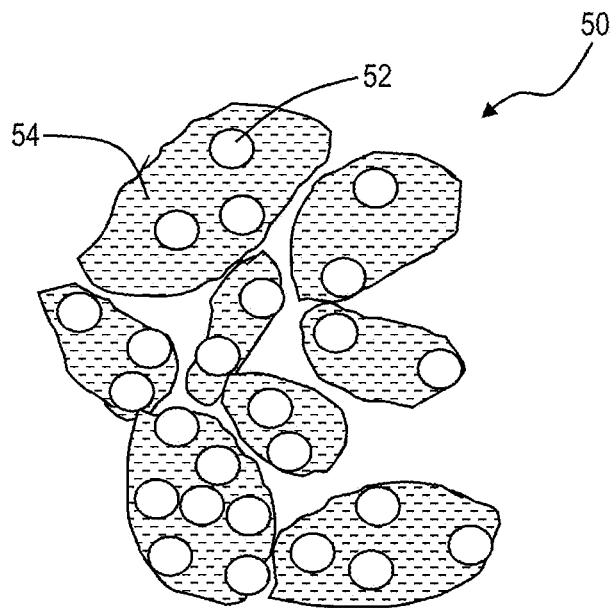
FIG. 2A is an illustration of a composite material according to various aspects of the current technology.
Figure 2B:
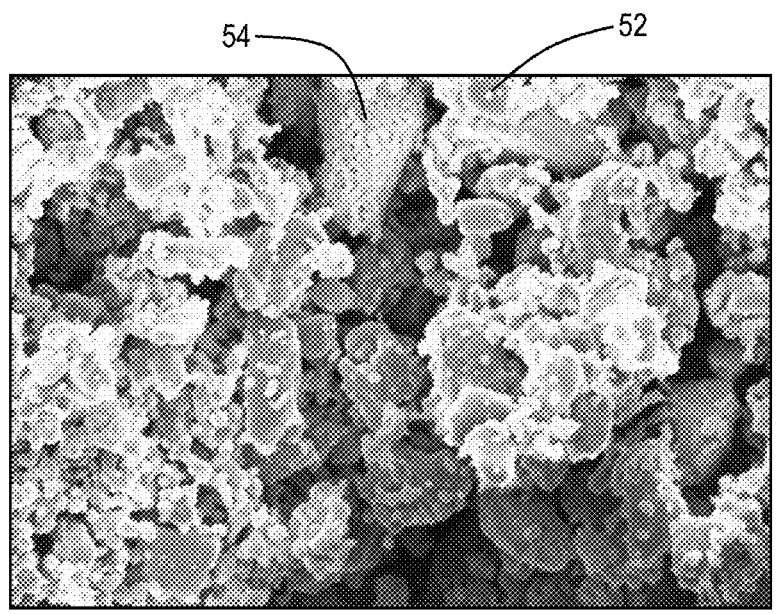
FIG. 2B is a scanning electron micrograph of a composite material according to various aspects of the current technology.

Thus, the present technology provides a material, i.e., a composite material, comprising $TiO_2$ and $Ti_xNb_yO_z$ that is useful as a negative electroactive or anode material. More particularly, and with reference to FIG. 2A, the current technology provides a material 50 comprising $TiO_2$ nanoparticles 52 at least partially embedded in a matrix material 54 comprising $Ti_xNb_yO_z$, where $0<x\leq2$, $0<y\leq24$, and $0<z\leq62$. FIG. 2B is a scanning electron micrograph of the material 50 in a sample. The material has a $Ti_xNb_yO_z:TiO_2$ weight ratio of greater than or equal to about 0.01 to less than or equal to about 0.99. In various embodiments, the material 50 includes more than one, i.e., a plurality of, species of the matrix material 54 comprising $Ti_xNb_yO_z$, where $0<x\leq2$, $0<y\leq24$, and $0<z\leq62$.

The $TiO_2$ nanoparticles 52 have a maximum dimension of greater than or equal to about 1 nm to less than or equal to about 1000 nm or greater than or equal to about 10 nm to less than or equal to about 200 nm, such as a size of about 1 nm, about 5 nm, about 10 nm, about 25 nm, about 50 nm, about 75 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1000 nm.

The matrix material 54 is a substrate comprising an interconnected web of the $Ti_xNb_yO_z$. A first portion of the $TiO_2$ nanoparticles 52 are completely embedded within the matrix material 54, meaning that they are fully surrounded by and encased within the matrix material 54. A second portion of the $TiO_2$ nanoparticles 52 are partially embedded within the matrix material 54, such as, for example, at exposed surfaces, where at least one portion of the surface of the $TiO_2$ nanoparticles 52 are exposed.

Figure 3:
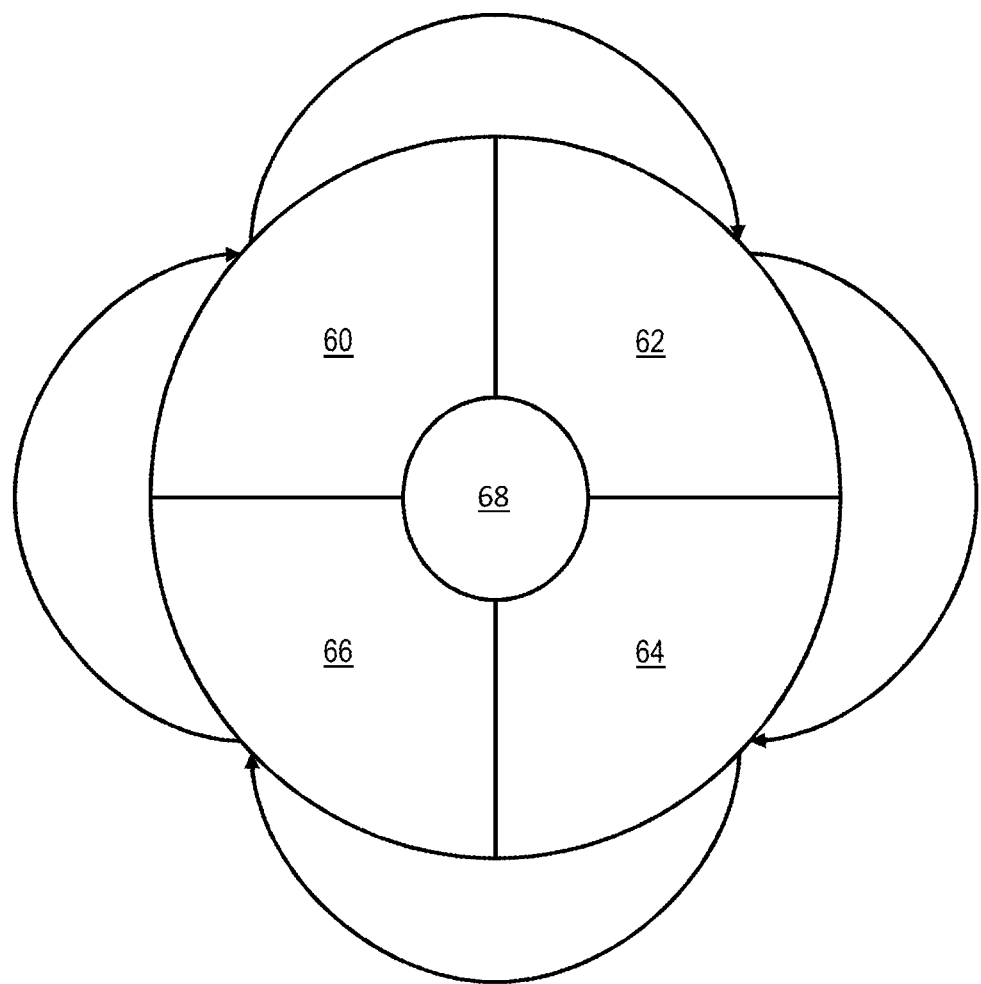
FIG. 3 is a wheel diagram showing the tenability of composite materials according to various aspects of the current technology.

The composition of the matrix material 54 is tunable when producing the material 50. As discussed in more detail below, the material 50 is produced by combining a precursor material with $TiO_2$ particles, wherein a precursor material:$TiO_2$ particles molar ratio can be adjusted in order to arrive at a predetermined composition of the matrix material 54. To demonstrate the tunability, FIG. 3 is a wheel diagram showing, as non-limiting examples, a first matrix material 60, a second matrix material 62, a third matrix material 64, and a fourth matrix material 66, wherein the weight ratio increases from the first matrix material 60 through the fourth matrix material 66. Each matrix material 60, 62, 64, 66 combines with $TiO_2$ nanoparticles 68 to form a composite material of the current technology. The first matrix material 60 is $TiNb_2O_7$, which has a theoretical capacity of about 388 mAh/g and forms from a molar ratio of about 1. The second matrix material 62 is $Ti_2Nb_{10}O_{29}$, which has a theoretical capacity of about 396 mAh/g, and forms from a molar ratio of about 2.5. The third matrix material 64 is $TiNb_6O_{17}$, which has a theoretical capacity of about 397 mAh/g and forms from a molar ratio of about 3. The fourth matrix material 66 is $TiNb_{24}O_{62}$, which has a theoretical capacity of about 402 mAh/g, and forms from a molar ratio of about 12. A low molar ratio may be employed to save cost, and a relatively high molar ratio may be employed to maximize energy density. As non-limiting examples, a molar ratio of 1 yields $TiNb_2O_7$, a molar ratio of 2.5 yields $Ti_2Nb_{10}O_{29}$, a molar ratio of 3 yields $TiNb_6O_{17}$, or a molar ratio of 12 yields $TiNb_{24}O_{62}$.

The material 50 is produced by further adjusting the molar ratio. For example, at a molar ratio of 1, $TiNb_2O_7$ is obtained. By increasing the amount of $TiO_2$, the molar ratio of $Nb_2O_5:TiO_2$ particles is greater than about 0 and less than about 1, and $TiO_2$ becomes embedded in $TiNb_2O_7$ to yield the material 50 at a predetermined level. Similarly, when the molar ratio of $Nb_2O_5:TiO_2$ particles is adjusted to be greater than about 1 to less than about 2.5, $TiO_2$ becomes embedded in $Ti_2Nb_{10}O_{29}$ to yield the material 50 at another predetermined level. When the molar ratio of $Nb_2O_5:TiO_2$ particles is adjusted to be greater than about 2.5 and less than about 3, $TiO_2$ embedded in $TiNb_6O_{17}$ is generated as the material 50 at yet another predetermined level. A predetermined level of the material 50 comprising $TiO_2$ embedded in $TiNb_{24}O_{62}$ is obtained by adjusting the molar ratio of $Nb_2O_5:TiO_2$ particles to greater than about 3 and less than about 12.

The material 50 can be formed into a layer having a thickness greater than or equal to about 1 μm to less than or equal to about 1000 μm, such as a thickness of about 1 μm, 50 μm, 100 μm, 150 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, or 1000 μm, that is suitable for an anode of, for example, an electrochemical cell, such as an electrochemical cell comprising a liquid electrolyte that cycles lithium ions or sodium ions or a solid-state electrochemical cell that cycles lithium ions or sodium ions. To adjust the performance of the anode, the material 50 can be doped or coated, for example, by at least one of a transition metal selected from the group consisting of Cr, Al, Mo, W, Ru, Ag, and combinations thereof (as non-limiting examples of transition metals), a transition metal compound selected from the group consisting of $Al_2O_3$, $Li_3PO_4$, $LiNbO_3$, $Li_4Ti_5O_{12}$, $MoS_2$, and combinations thereof (as non-limiting examples of transition metal compounds), or a carbon-based material selected from the group consisting of graphene, reduced oxide graphene, carbon nanotubes, carbon fibers, and combinations thereof (as non-limiting examples of carbon-based materials). Accordingly, in various embodiments the material 50 is formed as an anode in an electrochemical cell comprising the anode, a cathode, and an electrolyte (liquid or solid), wherein the electrolyte is disposed between or immersed within the anode and the cathode.

The current technology also provides a method of producing a material, wherein the material is the composite material described above. The method comprises forming a mixture of starting materials in a ball milling container. The starting materials comprise a precursor material and $TiO_2$ particles having a maximum dimension of greater than or equal to about 1 nm to less than or equal to about 1000 nm or greater than or equal to about 10 nm to less than or equal to about 200 nm, such as a size of about 1 nm, about 5 nm, about 10 nm, about 25 nm, about 50 nm, about 75 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1000 nm. The precursor material is at least one of $Nb_2O_5$ or $Ti_aNb_bO_c$, where $0 \leq a \leq 2$, $0 < b \leq 24$, and $0 < c \leq 62$. In some embodiments, the starting materials further comprise a liquid dispersing agent. The liquid dispersing agent is easily removed and can include ethanol, isopropanol, hexane, heptane, and the like, and combinations thereof, as non-limiting examples. The dispersing agent is provided at a volume of greater than 0 mL to less than or equal to 2V/3, where V is the volume of the ball milling container in mL.

The method then comprises ball milling the mixture to form the material, which is described above ($TiO_2$ nanoparticles embedded in a matrix material comprising $Ti_xNb_yO_z$, where $0 < x \leq 2$, $0 < y \leq 24$, and $0 < z \leq 62$). The ball milling is performed at a speed of greater than or equal to about 100 rpm to less than or equal to about 1000 rpm or greater than or equal to about 200 rpm to less than or equal to about 800 rpm, including speeds of about 100 rpm, about 200 rpm, about 300 rpm, about 400 rpm, about 500 rpm, about 600 rpm, about 700 rpm, about 800 rpm, about 900 rpm, about 1000 rpm. The ball milling is performed for a time period of greater than or equal to about 30 minutes to less than or equal to about 24 hours or greater than or equal to about 2 hours to less than or equal to about 12 hours, including times of about 30 minutes, about 1 hour, about 2 hours, about 3 hours, about 4 hours, about 5 hours, about 6 hours, about 7 hours, about 8 hours, about 9 hours, about 10 hours, about 11 hours, about 12 hours, about 14 hours, about 16 hours, about 18 hours, about 20 hours, about 22 hours, or about 24 hours.

In various embodiments, the precursor material and the $TiO_2$ particles are combined at a predetermined precursor material:$TiO_2$ particles molar ratio, as discussed above, in order to arrive at the material with a predetermined stoichiometry for the x, y, and z values and a predetermined $Ti_xNb_yO_z$:$TiO_2$ composite ratio of greater than or equal to about 0.01 to less than or equal to about 0.99. Examples of how the molar ratio affects the final product are described above in regard to FIG. 3. As shown in FIG. 3, the molar ratio is from greater than or equal to about 0.01 to less than or equal to about 15 in exemplary embodiments.

In some embodiments, the method yet further comprises heating the material at a temperature of from greater than or equal to about 600° C. to less than or equal to about 1200° C., including temperatures of about 600° C., about 650° C., about 700° C., about 750° C., about 800° C., about 850° C., about 900° C., about 950° C., about 1000° C., about 1050° C., about 1100° C., about 1150° C., or about 1200° C., for a time period of greater than or equal to about 3 hours to less than or equal to about 24 hours, including times of about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, about 22 hours, or about 24 hours.

In yet other embodiments, the method further comprises forming the material into a thin layer, such that the material can be used as an anode in, for example, an electrochemical cell. As a non-limiting example, the material can be mixed with a binder, conductive carbon, and a dispersant to form a slurry. The slurry is coated on a surface of a substrate, such as a current collector. Removing the dispersant, e.g., by evaporation and/or heating, results in an anode layer comprising an anode active material (greater than 0 wt. % to less than or equal to about 99 wt. %), a conductive additive (greater than 0 wt. % to less than or equal to about 30 wt. %), and a binder (greater than 0 wt. % to less than or equal to about 20 wt. %). Accordingly, the method can also include disposing the material as an anode into an electrochemical cell having an electrolyte (solid or liquid) and a cathode. The electrochemical cell can cycle lithium ions or sodium ions.

Embodiments of the present technology are further illustrated through the following non-limited example.

EXAMPLE

Starting materials $Nb_2O_5$ and $TiO_2$ nanoparticles are combined at a $Nb_2O_5$:$TiO_2$ molar ratio of about 1:4.461, ball milled, and heated as described above. The resulting material is $TiNb_2O_7$:$TiO_2$ with a weight ratio of about 5:4. FIG. 4 shows the charging and discharging capacity of the material versus that of $TiNb_2O_7$ alone. The material has a charging capacity of about 250 mAh/g and a discharge capacity of about 300 mAh/g. FIG. 5 shows the cycle performance of the material. The material has an improved capacity and coulombic efficiency relative to $TiNb_2O_7$ alone. FIG. 6 is a graph showing the rate performance of an anode comprising the material, wherein the discharge and charge capacities substantially overlap. FIG. 7 is a graph showing capacity retention. This graph shows that the material has an improved capacity retention, relative to $TiNb_2O_7$, as C-rate increases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A material comprising a plurality of nanoparticles consisting of $TiO_2$ at least partially embedded in an interconnected web of a matrix material comprising $Ti_xNb_yO_z$, where $0 < x \leq 2$, $0 < y \leq 24$, and $0 < z \leq 62$.

2. The material according to claim 1, wherein the matrix material comprises one or more of $TiNb_2O_7$, $Ti_2Nb_{10}O_{29}$, $TiNb_6O_{17}$, or $TiNb_{24}O_{62}$.

3. The material according to claim 1, wherein a portion of the $TiO_2$ nanoparticles are partially embedded in the matrix material.

4. The material according to claim 1, wherein a portion of the $TiO_2$ nanoparticles are completely embedded in the matrix material.

5. The material according to claim 1, wherein the material has a $Ti_xNb_yO_z$:$TiO_2$ weight ratio of greater than or equal to about 1:99 to less than or equal to about 100:101.

6. The material according to claim 1, wherein the $TiO_2$ nanoparticles have a maximum dimension of greater than or equal to about 1 nm to less than or equal to about 1000 nm.

7. The material according to claim 1, wherein the matrix material comprises a plurality of species of the $Ti_xNb_yO_z$, where $0 < x \leq 2$, $0 < y \leq 24$, and $0 < z \leq 62$.

8. The material according to claim 1, wherein the material further comprises a coating or a dopant comprising a material selected from the group consisting of a transition metal, a transition metal compound, or a carbon-based material comprising graphene, reduced oxide graphene, carbon nanotubes, carbon fibers, and combinations thereof.

9. An electrochemical cell comprising an anode comprising the material according to claim 1.

10. An anode comprising an anode material comprising a plurality of nanoparticles consisting of $TiO_2$ at least partially embedded in an interconnected web of a matrix material comprising $Ti_xNb_yO_z$, where $0<x\leq2$, $0<y\leq24$, and $0<z\leq62$, wherein the anode material has a $Ti_xNb_yO_z:TiO_2$ weight ratio of greater than or equal to about 1:99 to less than or equal to about 100:101.

11. The anode according to claim 10, wherein the anode is disposed in an electrochemical cell that cycles lithium or sodium ions.

12. The anode according to claim 10, wherein the anode is disposed in a solid-state electrochemical cell.

13. A method of producing a material, the method comprising:
   forming a mixture of starting materials in a ball milling container, the starting materials comprising a precursor material comprising at least one of $Nb_2O_5$ or $Ti_aNb_bO_c$, where $0\leq a\leq2$, $0<b\leq24$, and $0<c\leq62$, and $TiO_2$ particles; and
   ball milling the mixture to form the material,
   wherein the material comprises a plurality of nanoparticles consisting of $TiO_2$ at least partially embedded in an interconnected web of a matrix material comprising $Ti_xNb_yO_z$, where $0<x\leq2$, $0<y\leq24$, and $0<z\leq62$.

14. The method according to claim 13, wherein the starting materials further comprise a liquid dispersing agent, wherein the liquid dispersing agent is provided at a volume of greater than 0 mL to less than or equal to 2V/3, where V is the volume of the ball milling container in mL.

15. The method according to claim 13, wherein the precursor material and the $TiO_2$ particles are combined at a predetermined precursor material:$TiO_2$ particles molar ratio of about 0.01 to about 15 in order to arrive at the material with a predetermined stoichiometry for the x, y, and z and a predetermined $Ti_xNb_yO_z:TiO_2$ composite weight ratio of greater than or equal to about 0.01 to less than or equal to about 0.99.

16. The method according to claim 15, wherein the molar ratio is greater than or equal to about 0.5 to less than or equal to about 15.

17. The method according to claim 13, wherein the ball milling is performed at a speed of greater than or equal to about 100 rpm to less than or equal to about 1000 rpm for a time period of greater than or equal to about 30 minutes to less than or equal to about 24 hours.

18. The method according to claim 13, further comprising:
   heating the material at a temperature of from greater than or equal to about 600° C. to less than or equal to about 1200° C. for a time period of greater than or equal to about 3 hours to less than or equal to about 24 hours.

19. The method according to claim 13, further comprising:
   disposing the material as an anode into an electrochemical cell having an electrolyte and a cathode.

* * * * *